HIGH POWER MICROWAVE COMPONENTS

Filed Dec. 13, 1961 2 Sheets-Sheet 1

INVENTORS:
James W. Nielsen
Joel E. Zneimer

By Alan C. Rose
Attorney

INVENTORS:
James W. Nielsen
Joel E. Zneimer

By Alan C. Rose
Attorney 3,231,835
Patented Jan. 25, 1966

3,231,835

HIGH POWER MICROWAVE COMPONENTS

James W. Nielsen, Berkeley Heights, and Joel E. Zneimer, Verona, N.J., assignors to Airtron, Inc., Morris Plains, N.J.

Filed Dec. 13, 1961, Ser. No. 159,007
5 Claims. (Cl. 333—1.1)

This present invention relates to microwave device employing particular ferromagnetic materials which operate well at high signal power levels.

A family of microwave devices employing ferrites or other ferromagnetic material have been developed to perform switching functions or to provide nonreciprocal phase shift or attenuation. Typical devices of this type are disclosed in S. E. Miller Patent No. 2,946,025, granted July 19, 1960.

At microwave frequencies and high signal strengths, losses have been observed in conventional waveguide devices of this type. Three types of loss which have been analyzed are (1) losses caused by nonlinear effects, (2) low field losses, and (3) losses caused by heating effects.

With regard to losses caused by nonlinear effects, reference is made to articles by Harry Suhl which appeared in the proceedings of the Institute of Radio Engineers, vol. 44, p. 1270, 1956, and in the Journal of Phys. Chem. Solids, vol. 1, p. 209, 1957. These articles note, at increased signal levels, a first order effect which involves the appearance of a subsidiary resonance at fields several hundred oersteds below the main resonance, and a broadening or saturation of the main resonance. Certain conclusions drawn by Suhl are that increasing the line resonance width $\Delta H$ or the spin wave line width $\Delta H_K$ of a material will improve its power-handling capability. Increasing the spin wave line width $\Delta H_K$ is more desirable since the resonance line width $\Delta H$ should be kept small for other reasons. Another qualitative conclusion from Suhl's work is that decreasing the saturation magnetization of a material will increase its power-handling capability.

Low field losses become important in devices such as phase-shifting and field displacement ferrite devices in which the ferromagnetic material is biased below resonance. As discussed in an article by G. T. Rado, R. W. Wright, and W. H. Emerson which appeared in vol. 80 of the Physical Review at p. 273, 1950, certain low field losses are attributable to domain rotational resonance. Low field losses, like the nonlinear effect noted above, can be minimized by the use of materials having a low saturation magnetization. It has also been recently proposed by W. Malinofsky and R. W. Babbit in a paper presented at the sixth annual conference on magnetism and magnetic materials, November 14–17, 1960, New York City, that the losses caused by domain rotation may be drastically reduced through the use of very finely divided ferrite powders. When powders having a size less than critical size necessary for the existence of single domains are employed, the low field losses created by domain rotational resonance may be drastically reduced. The ferrite elements may be prepared by known flamespray techniques, followed by a hot pressing step.

The undesirable effects caused by heating effects involve two principal phenomena. The first is the loss of ferromagnetic properties above the Curie temperature.

The second effect is the increase in conductivity of all semiconductors, including ferrites, with increasing temperatures. This is an exponential function in all ferrites, and in those with larger temperature coefficients of conductivity, a "run-away" condition can soon set it. The material will then heat far beyond the Curie point, with the result that the desired nonreciprocal and other properties of the material disappear.

Now that the principal types of loss found in high power ferrite devices have been briefly discussed, certain specific ferrites which are promising for high power applications will be considered. The general properties of nickel ferrite, having the chemical formula $NiFe_2O_4$, are quite promising for high power work. Thus, the nickel ferrites have high Curie temperatures, show resistance to nonlinear effects, and can be prepared with low dielectric loss. They are also susceptible of preparation by the flame spray and hot pressing technique so that they show less low field loss. In addition, they have been used in the highest power ferrite devices built up to the present time. Nickel ferrite, however, has a saturation magnetization of somewhat over 3000 gauss, which is much higher than is desired from the low field loss standpoint, as discussed above. For C-bond devices, a saturation magnetization of about 1200 gauss is desirable. It has been proposed previously to substitute aluminum for some of the iron in nickel ferrite to reduce the saturation magnetization. However, this produces a "*g*" factor which is much higher than desirable; and such a high "*g*" has the undesirable effect of decreasing the magnetic field required for resonance. The resonance loss peak then approaches the low field loss region, in the loss vs. applied magnetic field characteristic, and it is not possible to construct low loss nonreciprocal devices which operate below resonance.

The high "*g*" arises from a compensation point in the substituted nickel aluminum ferrite, $NiFe_{(2-x)}Al_xO_4$ near the desired composition for a saturation magnetization of 1200. In this connection, reference is made to the work of L. R. Maxwell and S. J. Pickart, as disclosed in the Physical Review, vol. 92, p. 1120, 1953.

The principal object of the present invention is to provide a ferromagnetic material for efficient use at high microwave signal levels. Collateral objects of the present invention involve reduction of losses in microwave ferrite materials. Additional subsidiary objects involve the reduction of the saturation magnetization of ferrite materials without undue reduction of the Curie temperature.

In accordance with the present invention, the foregoing objects are achieved through the use of substituted gallium aluminum nickel ferrites or indium aluminum nickel ferrites. When both gallium and aluminum are substituted in nickel ferrites, simultaneously, the reduction of saturation magnetization is significant and the undesired compensation points produced by the substitution of one of these materials is avoided. In addition, the saturation magnetization is reduced sharply so that a satisfactory value of saturation magnetization may be reached before the Curie temperature becomes undesirably low. Thus, for example, a saturation magnetization of 1200 can be achieved with a composition of about $NiFe_{1.25}Ga_{.25}Al_{.5}O_4$ or the same ferrite with indium substituted for the gallium. In addition, there are no compensation points which produce undesirably high values of the "g" factor.

In accordance with a feature of the invention, a high power waveguide structure is provided with a ferrite element of the formula $NiM_xAl_yFe_{2-(x+y)}O_4$, where M may be either gallium or indium. The waveguiding structure may be of the conventional conductively bounded type or may be of a known form of dielectric or stripline waveguide. A biasing magnetic field structure may also be provided and a source of high power electromagnetic signals is to be coupled to the waveguiding structure.

The novel features which are believed to be characteristic of the invention both as to its organization and method of construction and operation, together with further ojects and advantages thereof, will be better understood from the following description, considered in connection with the accompanying drawing in which illustrative embodiments of the invention are disclosed by way of example. It is to be expressly understood that the drawing is for the purposes of illustration and description only and does not constitute a limitation of the invention.

Figure 1:
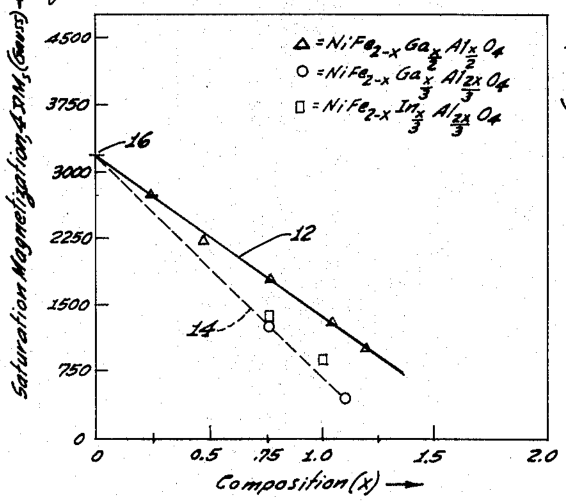
FIG. 1 shows the saturation magnetization of various substituted nickel ferrite materials in accordance with the invention, plotted against their compositions.
Figure 2:
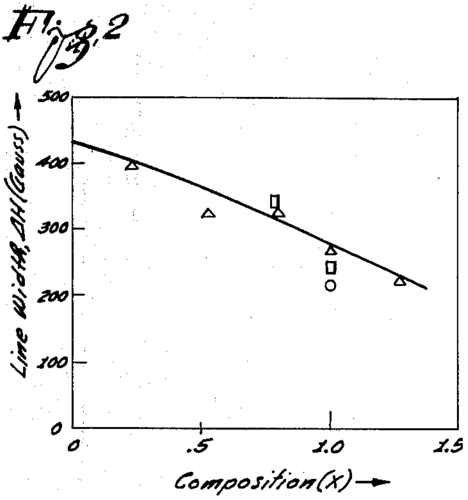
FIG. 2 is a plot of line width versus composition for the same substituted nickel ferrites.
Figures 3, 4:
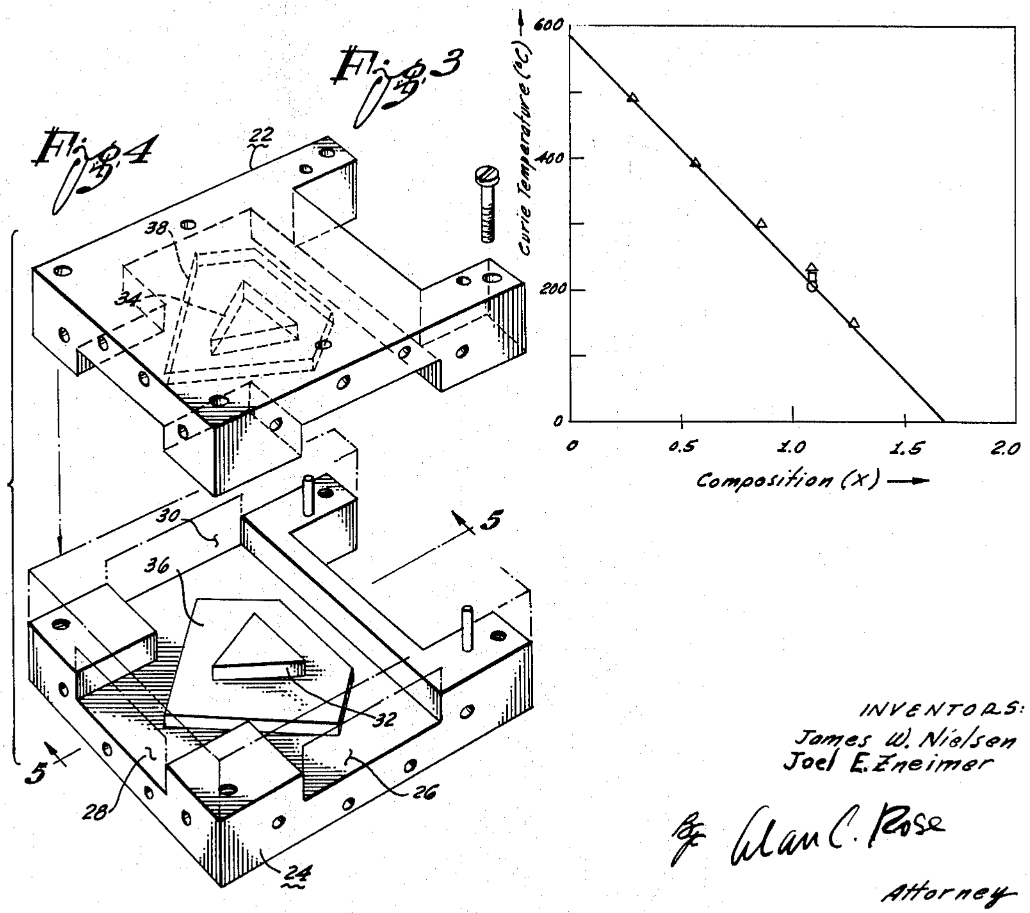
Figure 5:
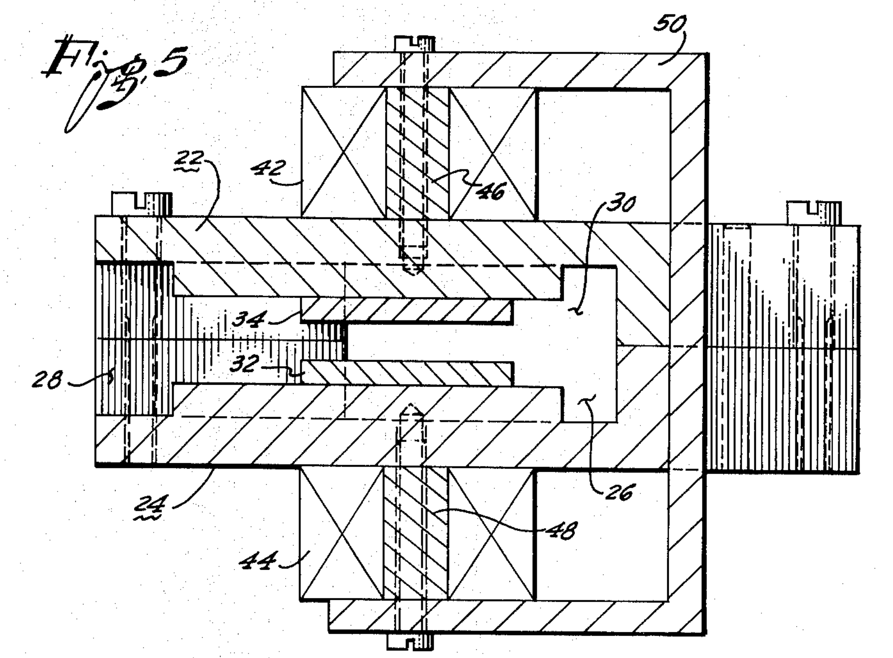
Figure 6:
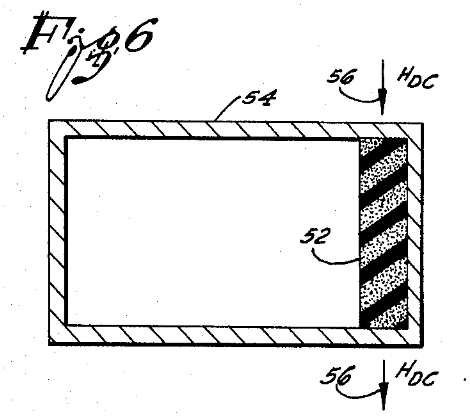

FIG. 3 indicates the variation of Curie temperature with composition for the nickel ferrites of FIGS. 1 and 2;

FIGS. 4 and 5 show a microwave circulator employing substituted nickel ferrite material, in accordance with the present invention;

FIG. 6 shows a phase shifter in accordance with the present invention; and

Figure 7:
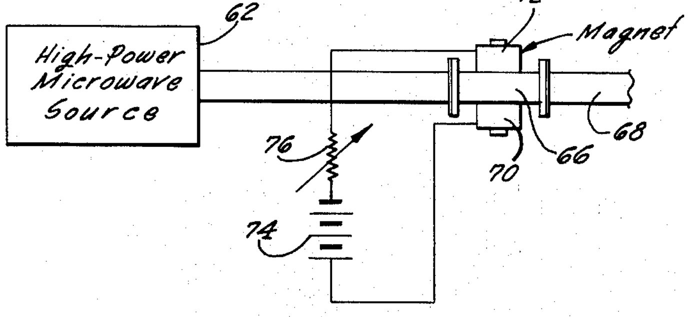

FIG. 7 is a block diagram showing a system in accordance with the present invention in which a substituted nickel ferrite waveguide component is energized by a high power source of RF energy.

With reference to the drawings, FIG. 1 includes a solid line plot 12 and a dashed line plot 14. As indicated by the formulae which appear in FIG. 1, the axis of the graph represents the amount of substituted gallium and aluminum. The upper plot 12 involves equal stoichiometric amounts of aluminum and gallium. The lower plot 14 involves substitutions of twice as much aluminum as the gallium or indium which is employed.

The point 16 at the upper left-hand border of the characteristics indicates that pure nickel ferrite has a saturation magnetization of approximately 3200 gauss. The plots 12 and 14 clearly must intersect at this point as they both involve progressive increases in substituted material starting with no additional material at the left-hand edge of the plot and progressively increasing toward higher values of substituted material with increasing values of "x." It may be noted, in passing, that the saturation magnetization reaches the desired value of about 1200 gauss at a value of $x=.75$, for the cases where the aluminum and gallium additions are in the ratio of 2 to 1.

FIG. 2 is a plot of the line width in gauss against the values of substituted material as discussed above, in connection with FIG. 1. The triangular square and circular points shown in FIG. 2 represent differing values of various materials as noted above in connection with FIG. 1.

FIG. 2 indicates that the line width decreases with increasing substitution of aluminum, gallium and indium. Fortunately, however, it has been determined that the decrease in line width does not affect the power-handling capacity in nickel ferrites as much as in other ferrites, thus constituting minor departure from Harry Suhl's theories as set forth in his articles cited above.

FIG. 3 shows that the Curie temperature drops significantly for increasing substitutions of aluminum, and gallium or indium. However, because the Curie temperature for pure nickel ferrite is close to 600° C., considerable substitution is possible without reducing the Curie temperature below acceptable levels. Thus, for example, the Curie point for values of $X=0.75$ is still well-above 300° C. This is well above acceptable levels for high power ferrite devices.

FIG. 4 is an exploded view of a 3-port circulator having the magnet structure removed. The circulator of FIG. 4 includes upper and lower portions 22 and 24, respectively. When these units are assembled, they define three ports 26, 28 and 30 to which waveguides may be connected. As indicated in FIG. 5, a magnet structure may be connected over the device to bias the ferrite elements 32 and 34 in a direction perpendicular to the broader surfaces of the waveguide. The metal plates 36 and 38 within the device perform an impedance-matching function.

In operation, waveguide energy incident at port 26 is coupled to the adjacent port 28, waveguide energy applied to port 28 is coupled to port 30, and finally, waveguide energy applied to port 30 is routed back to port 26. This type of nonreciprocal device is known as a circulator. The direction of coupling of energy may be reversed by reversing the biasing magnetic field applied to the ferrite elements 32 and 34. FIG. 5 is a cross-sectional view taken roughly along lines A—A of FIG. 4, showing the two components 22 and 24 in the assembled position. The port 28 appears to the left in FIG. 5 and the port 30 is in the background in the view of FIG. 5. The magnet structure for biasing the ferrite elements 32 and 34 includes the two coils 42 and 44, their associated polepieces 46 and 48, respectively, and a magnetic yoke structure 50 which closes the external magnetic circuit of coils 42 and 44. When the coils are energized, a steady biasing magnetic field is applied to the active ferrite elements 32, 34. If the direction of magnetization of the elements 32 and 34 is reversed, the circulator action described above with respect to microwave energy is reversed.

FIG. 6 shows a simple ferrite device which may be employed either for nonreciprocal attenuation or nonreciprocal phase-shift, depending on the magnetization level of the steady D.C. field. The ferrite element 52 which is located off center and adjacent one of the narrow side walls of the waveguide 54 may be biased by a suitable electromagnet (not shown) in the direction indicated by the arrows 56. When the biasing magnetic field is below the resonance value, nonreciprocal phase shift is produced. When the ferrite element is biased to resonance nonreciprocal attenuation is produced. These phenomena are well-known and are described in detail in the prior art cited above.

The ferrite elements 52 of FIG. 6 is formed of a substituted nickel ferrite of the type discussed above in which gallium, indium and aluminum are substituted for some of the iron. The device is intended for use with high power microwave sources, to minimize losses of the types discussed above.

The block diagram of FIG. 7 includes a high power microwave source 62 and a waveguide 64, a nonreciprocal ferrite device 66 of the type shown in FIGS. 4 through 6, an output waveguide 68, and a magnet including two coils 70 and 72 for providing a steady magnetic field through the ferrite element or elements within unit 66. The magnet coils 70 and 72 may be energized to any desired level by a suitable source of direct current 74 and a potentiometer 76. Thus, for example, the unit 66 may be biased to resonance for the substituted nickel ferrite included in unit 66 or may be biased to a point below resonance for the particular ferrite, to provide nonreciprocal attenuation or phase shift, respectively.

The microwave source 62 provides power at a high level so as to produce significant heating of the ferrite material within unit 66, as compared with its temperature when the microwave source 62 is deenergized. When the term "high power microwave source" is employed in the present specification and claims, an electromagnetic source having sufficient power to increase the temperature of the ferrite element by at least several degrees, at room temperature, is contemplated.

With regard to the compositions of the substituted gallium or indium and aluminum nickel ferrites which may be employed, they may best be expressed in terms of the following formula: $NiM_xAl_yFe_{2-(x+y)}O_4$, where M represents either gallium or indium. The ranges which are suitable for the practice of the present invention involve values of $x+y$ ranging from 0.05 to 1.5, and values of the ratio of $x$ to $y$ of from 0.1 to 3.0, and preferably between 0.25 and 2.0. It has been determined that particularly advantageous results accrue when the value of gallium or indium is less than the amount of aluminum. This corresponds to values of $x/y$, from 0.25 to 1.0.

In the substitution of aluminum and gallium in nickel ferrite, there are two possible substitution sites known as A-sites and B-sites, which are the tetrahedral and octahedral sites, respectively. The gallium and indium tend to substitute primarily in the A-sites whereas the aluminum substitutes primarily in the octahedral, or B-sites. Neither ion, however, goes exclusively into one site. The unusual results which are produced in accordance with the present invention are believed to result from the combination effects of the substitutions in the two different sites, which shifts the undesired compensation point mentioned above to very high concentrations of the substituents.

In tests of a $y$-type circulator made with ferrite material in accordance with the invention, the following conditions obtained. First, the device was operated at C-band, near 5 kilomegacycles, with a ten percent bandwidth. The insertion loss of the device was 0.5 db or less to the desired output port, and it had greater than 20 db isolation from the third port of the circulator. The material had a saturation magnetization of less than 1200 gauss, a line width ΔH of 325 oersteds, a $g$-factor of 2.5 and a dielectric constant at 20 megacycles of about 1. Test conditions involved peak power of 75 kilowatts with a 0.001 duty cycle, for an average power of 75 watts. In another test 475 watts continuous wave power was passed through the device in an oven at 85° C. The drive current remained constant at 1.2 amperes from 25° C. to 85° C. The device has a switching time of 100 microseconds. No deterioration in properties took place during the foregoing tests.

In the manufacture of the ferrites, constituent portions of the substituted nickel aluminum ferrites are initially flame sprayed to form fine particles which are individually smaller than the single magnetic domain size. In the hot pressing step, heat and pressure must be employed. Since ferrite materials are easily reduced under hot pressing conditions, the usual technique using a graphite mold must be modified. As the sintering step must take place under oxidizing conditions the dies must be in the form of alumina or some other stable refractory material. A resistance furnace, or a graphite susceptor energized by an R.F. generator may be employed to heat the dies while pressure is applied. Ferrite slugs one and one-half inches in diameter may readily be made by the foregoing method. The slugs are subsequently cut by appropriate sawing or grinding techniques to the proper shape for use in high power waveguide components.

It is to be understood that the above-described arrangements are illustrative of the application of the principles of the present invention. Numerous other arrangements may be devised by those skilled in the art without departing from the spirit and scope of the invention. Thus, by way of example, and not of limitation, although conductively bounded waveguides are disclosed in the drawings, the present invention is also applicable to dielectric waveguides and other high frequency devices employing ferrite materials; and larger size ferrite elements may be used to increase the heat dissipation; accordingly, from the foregoing remarks, it is to be understood that the present invention is limited only by the spirit and scope of the appended claims.

In the claims:

1. In combination:

a conductively bounded waveguiding structure; and a ferrite element located in said waveguiding structure, said ferrite having a composition corresponding to the following formula:

$$NiM_xAl_yFe_{2-(x+y)}O_4$$

wherein M is selected from the group consisting of gallium and indium and wherein $x+y$ have a value between 0.05 and 1.5 and $x/y$, has a value between 0.1 and 3.0.

2. In combination:

a conductively bounded waveguiding structure; and a ferrite element located in said waveguiding structure, said ferrite having a composition corresponding to the following formula:

$$NiM_xAl_yFe_{2-(x+y)}O_4$$

wherein M is selected from the group consisting of gallium and indium and wherein $x+y$ have a value between 0.05 and 1.5 and $x/y$, has a value between 0.25 and 2.0.

3. In combination:

a conductively bounded waveguiding structure; and a ferrite element located in said waveguiding structure, said ferrite having a composition corresponding to the following formula:

$$NiM_xAl_yFe_{2-(x+y)}O_4$$

wherein M is selected from the group consisting of gallium and indium and wherein $x+y$ have a value between 0.25 and 1.0 and $x/y$, has a value between 0.1 and 3.0.

4. In combination:

an electromagnetic waveguiding structure; and a ferrite element coupled to said waveguiding structure, said ferrite having a composition corresponding to the following formula:

$$NiM_xAl_yFe_{2-(x+y)}O_4$$

wherein M is selected from the group consisting of gallium and indium, and wherein $x+y$ have a value between 0.05 and 1.5 and $x/y$, has a value between 0.1 and 3.0.

5. In combination:

an electromagnetic waveguiding structure, ferrite material coupled to said waveguiding structure, said ferrite material having a composition corresponding to the following formula:

$$NiM_xAl_yFe_{2-(x+y)}O_4$$

wherein M is selected from the group consisting of gallium and indium and wherein $x+y$ have a value between 0.5 and 1.5 and $x/y$, has a value between 0.1 and 3.0, and means for applying microwave energy at high power levels along said waveguiding structure to said ferrite material.

References Cited by the Examiner

UNITED STATES PATENTS

| | | | |
|---|---|---|---|
| 2,948,868 | 8/1960 | Reeves | 333—24.1 |
| 2,958,055 | 10/1960 | Rowan | 333—24.1 |
| 2,975,383 | 3/1961 | Seling | 333—98 |
| 3,011,137 | 11/1961 | Albanese | 333—98 |

(Other references on following page)

| | | | |
|---|---|---|---|
| 3,042,999 | 7/1962 | Page et al. | 29—155.5 |
| 3,048,913 | 8/1962 | Ball | 29—155.5 |
| 3,063,024 | 11/1962 | Davis | 333—1.1 |
| 3,070,760 | 12/1962 | Wheeler | 333—1.1 |
| 3,085,212 | 4/1963 | Clark et al. | 333—1.1 |

OTHER REFERENCES

Economos, "Magnetic Ceramics," Journal of the American Ceramic Society, volume 38, No. 7, July 1955, pages 241–244 (243 most pertinent).

Maxwell et al.: "Magnetization in Nickel Ferrite-Aluminates and Nickel Ferrite-Gallates," Physical Review, volume 92, No. 5, Dec. 1, 1953, pages 1120–1126.

Maxwell et al.: "Magnetic and Crystalline Behavior of Certain Oxides Systems With Spinel and Perovskite Structures," Physical Review, volume 96, No. 6, Dec. 15, 1954, pages 1051–1504.

TOBIAS E. LEVOW, *Primary Examiner.*

HERMAN K. SAALBACH, MAURICE A. BRINDISI, *Examiners.*